United States Patent [19]

Force

[11] Patent Number: 4,576,005
[45] Date of Patent: Mar. 18, 1986

[54] WELLHEAD GAS TREATMENT AND CO-GENERATION METHOD AND SYSTEM

[76] Inventor: Louis W. Force, 718 North Dr., New Buffalo, Mich. 49117

[21] Appl. No.: 689,151

[22] Filed: Jan. 7, 1985

[51] Int. Cl.$^4$ ............................................. F01K 23/06
[52] U.S. Cl. ........................................ 60/618; 123/3; 60/648
[58] Field of Search .................... 60/616, 618, 648; 123/3

[56] References Cited

U.S. PATENT DOCUMENTS 4,182,127  1/1980  Johnson .............................. 60/618

Primary Examiner—Allen M. Ostrager
Attorney, Agent, or Firm—Philip D. Junkins

[57] ABSTRACT

A thermodynamic method and system is described and claimed for treating wellhead gas to recover valuable liquefiable hydrocarbon components from such gas and for utilizing the resulting dry gas as a fuel for an internal combustion engine driving a generator for the co-generation of electric power. In accordance with the invention, raw wellhead gas as a by-product of gas and oil field operations is compressed and cooled to condense the ethane and higher molecular weight hydrocarbon components of the gas and the condensed components are removed as liquefied hydrocarbon product. The remaining non-condensible methane and lower molecular weight components of the gas are used as fuel in an internal combustion engine driving a generator. The waste heat of the internal combustion engine, embodied in the engine's coolant fluid and exhaust gases of combustion, is utilized to indirectly heat the circulating fluid medium in a closed circuit organic Rankine Cycle engine to produce work energy which is utilized in part to compress the raw wellhead gas and in part to cool such compressed gas and thereby effect the separation of the liquefiable components of the gas from the non-condensible components of the gas.

14 Claims, 1 Drawing Figure

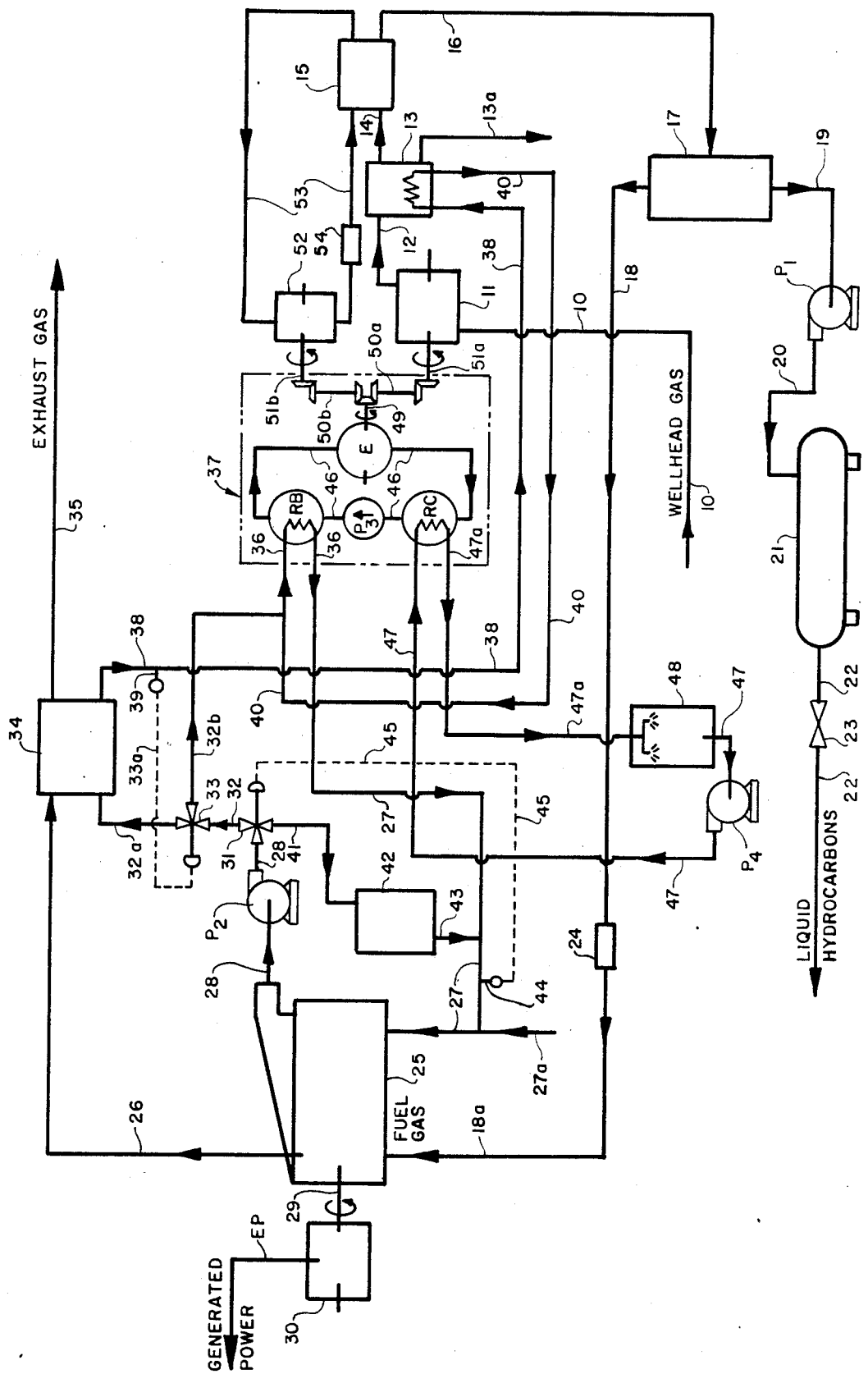

WELLHEAD GAS TREATMENT AND CO-GENERATION METHOD AND SYSTEM

BACKGROUND OF THE INVENTION

The present invention relates to a novel method and system for treating wellhead gas to recover valuable liquefiable hydrocarbon components from such gas and for utilizing the resulting dry gas as a fuel for internal combustion engine-generator systems for the co-generation of electric power.

Wellhead gas is generally comprised of a mixture of the following gases and vapors: nitrogen, carbon dioxide, methane, ethane, propane, iso-butane, n-butane and iso-pentane; and small quantities of entrained water, all obtained as by-products of gas and oil field production operations at the well heads. Wellhead gas is particularly rich in methane gas (75-95 mol %), includes appreciable quantities of ethane (3-8 mol %) and propane (0.5-5 mol %), and as a moisture-free mixture has a heating value of 1400-2000 Btu per cubic foot. For new gas or oil wells the utilization of wellhead gas has a rather low economic attractiveness because of the relatively low quantity of such gas with respect to the high value gas and liquid petroleum products directly produced from such new wells. As wells mature the utilization of wellhead gas is an increasingly important factor in the economic decision to continue gas and oil production.

SUMMARY OF THE INVENTION

The present invention comprises a unique system and methodology for treating wellhead gas to strip out and recover valuable liquefiable hydrocarbons and to utilize the resulting dry gas (principally methane) as a fuel in a natural gas fired internal combustion engine driving a generator for the co-generation of electric power. In accordance with the invention, the hot water leaving the cooling jacket of the internal combustion engine is further heated by indirect heat exchange with the engine's exhaust gases and utilized in the boiler section of an organic Rankine cycle heat engine to heat and vaporize the liquefied gas refrigerant in such engine's closed circuit. The hot refrigerant is passed through an expander with the result that shaft horsepower is economically produced by the Rankine cycle engine and utilized to drive a refrigeration compressor in a secondary cooling circuit and drive a gas compressor for compressing the raw wellhead gas received by the system. The compressed wellhead gas is cooled through indirect heat exchange with the coolant of the secondary cooling circuit whereby the heavier hydrocarbons in the gas are condensed and thereafter separated from the non-condensible methane portion of the gas. The resulting methane gas is reduced in pressure and utilized as fuel (heating value of about 1000 Btu per cubic foot) in the gas fired internal combustion engine driving the electric power generator. The heavier hydrocarbons (principally ethane and propane) are stored under pressure and marketed as liquefied fuel.

It is an object of the present invention to provide an improved thermodynamic method and system for treating wellhead gas to economically recover valuable liquefiable hydrocarbon components from such gas and for utilizing the resulting dry gas as a fuel in an internal combustion engine-generator system for the co-generation of electrical power.

A further object of the invention is to provide an improved thermodynamic method and system for: treating raw wellhead gas to economically separate liquefiable hydrocarbon components from such gas; utilizing the resulting dry gas as a fuel in an internal combustion engine-generator system for the co-generation of electric power; and utilizing the heat energy of the engine's exhaust gases and heated coolant stream to effect the separation of the liquefiable hydrocarbon components from the raw wellhead gas.

Another object of the invention is to provide an improved thermodynamic method and system for: recovering valuable heavy hydrocarbon components condensed from the raw wellhead gas; utilizing the non-condensible, relatively light remaining components of such gas as fuel in an internal combustion engine driving a generator for the co-generation of electric power; and economically utilizing the waste heat of the engine's exhaust gases and heated engine coolant to effect the recovery of the condensible heavy hydrocarbon components from the raw wellhead gas.

BRIEF DESCRIPTION OF THE DRAWING

The accompanying drawing is a schematic flow sheet diagramatically illustrating one embodiment of the method and system of the present invention.

DESCRIPTION OF THE PREFERRED EMBODIMENT

Referring now to the drawing, there is illustrated a preferred embodiment of the wellhead gas treatment and co-generation method and system of the invention. According to the invention, raw wellhead gas obtained from oil field producing wells is introduced to the system (located in the proximity of the wells) through feed line 10 and passed through such line to a gas compressor 11. As previously indicated, the raw wellhead gas is typically comprised of a mixture of nitrogen, carbondioxide, methane, ethane, propane, iso-butane, n-butane and iso-pentane together with small quantities of entrained water. The heating value of wellhead gas mixtures is in the range of 1400 to 1500 Btu per cubic foot of gas and as collected at the well heads the raw gas normally has a temperature of about 60° F. and a pressure of 2-10 psi. Through the compressor 11 the pressure of the raw gas is increased to 270-320 psi.

The compressed wellhead gas leaves compressor 11 through line 12 and is passed through a glycol or methanol gas dehydrator 13 (of well known design) to remove water and thereafter through line 14 to a gas cooler 15 wherein the temperature of the gas is reduced to −20° F. to 20° F. Cold compressed wellhead gas mixture leaves the cooler 15 through line 16 and is passed to a separation chamber 17 of well known pressure chamber or cyclone chamber design wherein the methane and other non-condensible components of the mixture are separated from the liquefied ethane, propane and higher molecular weight hydrocarbons and carbon-dioxide (if any) and leave the separator through overhead line 18. The separated liquefied components of the cold compressed wellhead gas mixture leave separator 17 through bottoms line 19 and are pumped under high pressure by pump $P_1$ through line 20 to a liquefied gas product storage tank 21. The liquefied gas product in storage tank 21 (principally ethane and propane) may be removed as desired through line 22 and valve 23.

The compressed methane and other non-condensible gases (principally nitrogen) in separator overhead line 18 comprise the wellhead gas derived dry fuel gas mixture for the system of the present invention and are passed through a pressure regulator 24 in such line to reduce the pressure of the fuel gas mixture to the level required for feeding the mixture (line 18a) into gas-fired internal combustion engine 25 of well known Otto Cycle design. The fuel gas mixture introduced to engine 25 has a heating value of about 1000 Btu per cubic foot, is combusted in the cylinders of the engine and is exhausted therefrom through exhaust gas line 26. The gas-fired internal combustion engine 25 is water jacketed for cooling purposes and cooling water (at the relatively high temperature of 160° F. and above) is introduced to the engine's cooling system through line 27 under pressure as applied by circulating pump $P_2$ in the cooling water circuit external of the engine. The flow rate and pressure of the water in the cooling water circuit are such that the temperature of the water leaving the engine's cooling jacket through line 28 is maintained at about 190°–200° F. The shaft horsepower generated by engine 25 is transferred through drive shaft 29 to generator 30 to produce marketable cogenerated electric power, indicated as product power EP in the drawing.

As previously indicated, the cooling circuit for engine 25 includes cooling water inlet line 27, water outlet line 28 and circulating pump $P_2$. The circulating pump $P_2$ is located in outlet line 28 and pumps the water leaving the engine 25 through a diverter valve 31 and line 32 and thereafter to and through a second diverter valve 33 with a first portion of the hot cooling water from the engine passed through line 32a to a heat exchanger 34 wherein such portion of water is further heated by indirect heat exchange with the high temperature combustion exhaust gases leaving engine 25 through line 26. The engine exhaust gases, after giving up heat in exchanger 34, are passed through line 35 and discharged to atmosphere at substantially reduced temperature. A second and principal portion of the hot cooling water from engine 25 is directed by valve 33 through line 32b and line 36 to and through the boiler RB of an organic Rankine Cycle engine 37 of well known design. The hot water in line 36 gives up heat in the boiler RB, by indirect heat exchange, to the high molecular weight liquefied gas refrigerant flowing in the closed circuit of the Rankine engine 37, as described hereinafter. Following its passage through boiler RB, the water in line 36 of the cooling circuit of engine 25 is returned to such engine through line 27. The portion of hot cooling water in line 32a, after further heating in exchanger 34, is passed through line 38 (and is regulated as to quantity by temperature controller 39 in line 38) to provide heat energy to the gas dehydrator 13 after which such portion of hot water is returned through line 40 to line 36 and joins the major portion of heated water in line 32b for mixed flow in line 36 and through boiler RB. The diverter valve 33 and temperature controller 39 are electrically, hydraulically or mechanically connected via control line 33a. As previously described, the gas dehydrator 13 is utilized (as required) to remove any entrained water from the raw wellhead gas. In operation, the compressed wellhead gas in line 12 is mixed or co-mingled with glycol or methanol solution in the dehydrator with the entrained water (if any) absorbed by the solution and thereafter boiled off of the solution by the indirect heat of the heated water (220°–250° F.) entering dehydrator 13 through line 38. The water removed from the wellhead gas leaves the dehydrator unit through waste water line 13a.

To maintain the required temperature of the recirculated engine cooling water in line 27, a small portion of the hot water leaving the cooling jacket of engine 25 through line 28 may be diverted by diverter valve 31 to line 41 and auxillary cooler 42 wherein such portion of water is cooled by air or other well known means and thereafter returned by line 43 to cooling water feed line 27 in the cooling water circuit of engine 25. The diverter valve 31 is controlled by temperature controller 44 which is located in engine cooling water line 27 and is electrically, hydraulically or mechanically connected to valve 31 via control line 45. Make-up water (as required) may be introduced to the cooling circuit through line 27a.

Returning now to discussion of the organic Rankine Cycle engine 37, such engine comprises a most efficient means for converting heat (particularly waste heat) into work energy. In the case of the method and system of the present invention, engine 37 utilizes the waste heat of the cooling circuit and exhaust gases of gas-fired internal combustion engine 25 to generate work horsepower for use in accomplishing the compression of the wellhead gas, cooling of such gas and separation of the heavy liquefiable hydrocarbons from such gas. Usually the working fluid in a waste heat Rankine Cycle thermal power generating system is water heated to form steam. However, steam has a very low power density at the lower temperatures encountered in most waste heat sources. Because of its very low molecular weight, a given weight of steam occupies a very large volume, for example it would require over 6 cubic feet per minute of saturated steam at 212° F. to generate one horsepower (assuming a 90° F. condenser temperature). On the other hand, if a high molecular weight liquefied gas refrigerant (such as a liquefied hydrocarbon gas or a liquefied halogenated hydrocarbon gas) is employed in the same Rankine Cycle system under the same temperature conditions, the vastly greater density of the vapor results in a flow rate of less than one-third of a cubic foot of refrigerant vapor per minute to generate one horsepower of work energy.

The organic Rankine Cycle engine 37 of the system of the present invention is comprised of a closed liquid-vapor refrigerant circuit 46 which includes the previously mentioned refrigerant boiler RB, an expander E, a refrigerant condenser RC and a refrigerant circulating pump $P_3$. The refrigerant boiler and refrigerant condenser are preferably shell and tube type heat exchangers wherein the liquefied gas refrigerant is vaporized (boiler RB) by the application of the heat of the hot water in line 36 (200°–215° F.) and is condensed (condenser RC) by a counter current stream of cooling water fed to the condenser (80°–100° F.) line 47 by circulating pump $P_4$. The heated cooling water from line 47 and condenser RC (90°–110° F.) is returned to a cooling tower 48 through line 47a. The refrigerant circulating pump $P_3$ in refrigerant circuit 46 of the organic Rankine Cycle engine 37 is preferably of positive displacement type and the expander E in the closed circuit 46 is preferably of positive displacement, rotary screw design or of axial turbine design and produces significant shaft horsepower through power takeoff shaft 49. In operation, the refrigerant medium in circuit 46 of the organic Rankine Cycle engine 37 is condensed in the refrigerant condenser RC (at about 90°–100° F.) with the resulting liquefied refrigerant gas pumped by pump $P_3$ through the refrigerant boiler RB wherein the liquid refrigerant is heated to at least 200° F. The heated refrigerant is thereafter expanded through the expander E to produce shaft horsepower and the expanded refrigerant vapor is thereafter returned via the closed circuit 46 to the condenser RC.

In accordance with the present invention, the shaft horsepower output of the organic Rankine Cycle engine 37, as provided by power takeoff shaft 49, is distributed by conventional rotary mechanical power linkages 50a and 50b to power drive shafts 51a and 51b, respectively. These power linkages and power drive shafts are of any well known design and are illustrated schematically in the drawing. Power shaft 51a drives gas compressor 11 which compresses the raw wellhead gas in line 10 prior to dehydration of such gas in dehydrator 13 and the cooling of such gas in cooler 15. Power shaft 51b drives a refrigeration compressor 52 in closed refrigerant circuit 53. Refrigerant circuit 53, which preferably utilizes a fluorinated chlorinated hydrocarbon refrigerant (such as FREON brand refrigerant manufactured by E. I. duPont) as its working fluid, includes an expander 54 and cooler 15 wherein the expanded, cold refrigerant gas accomplishes, by indirect heat exchange, the cooling of the compressed wellhead gas introduced to the cooler 15 via line 14.

In satisfaction of the objectives of the present invention, waste heat from gas-fired internal combustion engine 25, in the form of the hot water discharged from the engine's cooling system and the high temperature exhaust gases from the engine's combustion system, is utilized through indirect heat exchange as the heat source for an organic Rankine Cycle engine 37 and as the heat source for a gas dehydrator 13. The organic Rankine Cycle engine, operating with a liquefied hydrocarbon gas refrigerant as the working medium in its closed circuit, economically produces shaft horsepower to drive a gas compressor 11 and a refrigeration compressor 52. These compressors accomplish compression and cooling of the raw wellhead gas as the means for separating the higher molecular weight liquefiable hydrocarbons from the raw wellhead gas as readily marketable liquefied hydrocarbon gas (principally ethane and propane) with the residual gas (principally methane) utilized as dry gaseous fuel for the internal combustion engine 25, such engine driving a generator 30 to co-generate marketable electric power or electric power for use in the oil field in the area of the wells from which the wellhead gas is derived.

Through incorporation of the thermodynamic system and methodology of this invention with respect to the utilization of raw wellhead gas, substantial operational advantages in a gas-fired power generation plant may be gained and heat economies effected along with the recovery from the wellhead gas of valuable quantities of liquefied ethane and propane. These advantages and economies include: providing the gas-fired internal combustion engine of the engine-generator unit with clean dry methane fuel (heating value of about 1000 Btu per cubic foot) derived from raw wellhead gas; full utilization of the waste heat of the internal combustion engine to drive an organic Rankine Cycle engine and thereby generate the horsepower required to compress and cool the raw wellhead gas as means for liquefying the higher molecular weight hydrocarbons in such gas; and the economic separation of the liquefied hydrocarbons from such gas as marketable liquefied product fuel. The following example will further illustrate the nature of the unique thermodynamic system and methodology of the invention, it being under stood that the invention is not limited to the operating conditions or flow quantities set forth therein.

EXAMPLE

A thermodynamic system, including wellhead gas treating and sepatating apparatus, heat exchange devices and sub-systems, and electric power generation equipment as described above, arranged and interconnected in accordance with the schematic process flow diagram of the drawing, was designed to: receive raw wellhead gas from oil field producing wells; compress, dehydrate and cool the raw wellhead gas to liquefy the heavier hydrocarbons therein and separate the liquefied hydrocarbons therefrom; feed the methane gas portion of the wellhead gas (free of water and liquefiable hydrocarbons) as fuel to a water-cooled, gas-fired internal combustion engine-generator unit to produce electric power; and utilize the waste heat energy generated in the internal combustion engine to accomplish the separation of the raw wellhead gas into gaseous methane fuel and marketable liquefied hydrocarbons. The internal combustion engine was rated at .250 horsepower at its output shaft. The raw wellhead gas fed to the system was analyzed and shown to include the following components (values are mol %): nitrogen 1.03, carbon dioxide 0.21, methane 81.45, ethane 6.94, propane 4.00, iso-butane 1.79, n-butane 1.49, and iso-pentane and other 3.09. The heat, pressure, material balance data and systems performance data are set forth in tabular form below:

| Heat, Pressure and Material Balance & Performance Data | | | | | | |
|---|---|---|---|---|---|---|
| Data Point Description | Pres., psi | Temp., °F. | Gas Flow, scfm | Liquid Flow, gpm/gph* | Heat Value Btu/ft$^3$ | Power kw |
| Line 10 Raw Gas Inlet | 5 | 60 | 50 | — | 1475 | — |
| Line 16 Gas & Liquefied Gas | 300 | 0 | 33 | 10.3* | — | — |
| Line 18 Overhead Gas (Methane) | 300 | 60 | 33 | — | 1000 | — |
| Line 18a Fuel Gas (Methane) | 5 | 60 | 33 | — | 1000 | — |
| Line 19 Liq. Gas (Ethane & Pro.) | 275 | 0 | — | 10.3* | — | — |
| Line 26 Engine Exhaust Gases | 0.2 | 1200 | 1224 | — | — | — |
| Line 34 System Exhaust Gases | Atmos. | 300 | 1224 | — | — | — |
| Line 32 Engine Coolant Disch. | 10 | 195 | — | 141 | — | — |

-continued

| | Heat, Pressure and Material Balance & Performance Data | | | | | |
|---|---|---|---|---|---|---|
| Data Point Description | Pres., psi | Temp., °F. | Gas Flow, scfm | Liquid Flow, gpm/gph* | Heat Value Btu/ft³ | Power kw |
| Line 32b Heating Medium | 10 | 195 | — | 110 | — | — |
| Line 38 Heating Medium | 10 | 250 | — | 31 | — | — |
| Line 36 ORCE** Boiler Heating Medium Feed | 10 | 205 | — | 141 | — | — |
| Line 40 Heating Medium | 10 | 240 | — | 31 | — | — |
| Line 27 ORCE Boiler Disch. | 10 | 170 | — | 141 | — | — |
| Line 47 ORCE Conden. Cooling Medium Feed | 5 | 85 | — | 200 | — | — |
| Line 47a ORCE Conden. Disch. | 3 | 95 | — | 200 | — | — |
| Line EP Electric Power Generated | — | — | — | — | — | 180 |

**ORCE: Organic Rankine Cycle Engine

From the above data table it will be observed that raw wellhead gas, received by the above described system at the flow rate of 50 cubic feet per minute and having a heating value of 1475 Btu per cubic foot, has been separated into dry fuel gas (methane) for combustion in a 250 Horsepower internal combustion engine at the rate of 33 cubic feet per minute and liquefied hydrocarbons (principally ethane and propane) in the quantity of 10.3 gallons per hour. The combustion of the fuel gas in the internal combustion engine has resulted in the production of 180 kilowatts of power and the waste heat generated by the engine and carried out of the engine's systems in the form of heated cooling water and exhaust gases, has been effectively utilized to accomplish the separation of the dry fuel gas components and liquefiable hydrocarbon components of the raw wellhead gas.

While a preferred embodiment of the invention has been described and an example set forth, it is to be understood that such description and example are merely illustrative of the underlying principles of the invention and are not to be limiting of the scope of the invention and the following claims.

What I claim is:

1. In the method of treating raw wellhead gas to recover liquefiable hydrocarbons therefrom and of utilizing the remaining non-condensible hydrocarbon gas as fuel in an internal combustion engine - generator system to produce electric power, the steps comprising:
   (a) compressing raw wellhead gas to a pressure and cooling said compressed wellhead gas to a temperature sufficient to condense the ethane and higher molecular weight hydrocarbon components of said wellhead gas;
   (b) separating the condensed components of said wellhead gas from the non-condensible methane and lower molecular weight components thereof in a pressure chamber and removing said condensed components of said wellhead gas from said chamber as a bottoms stream of liquefied hydrocarbon product;
   (c) removing the non-condensible methane and lower molecular weight components of said wellhead gas from said pressure chamber as a combustible gaseous stream and utilizing said gaseous stream as fuel in the engine of an internal combustion engine - generator system to produce electric power;
   (d) introducing water coolant to the cooling section of the engine of said engine - generator system to cool said engine with the attendant heating of said coolant;
   (e) removing the heated water coolant from the cooling section of said engine and utilizing said heated coolant as a waste heat source for heating the circulating fluid medium in a closed circuit organic Rankine cycle engine to produce work energy; and
   (f) utilizing a first portion of the work energy produced by said Rankine cycle engine to compress said wellhead gas and a second portion of the work energy produced by said Rankine cycle engine to cool said compressed wellhead gas to condense the ethane and higher molecular weight hydrocarbon components of said wellhead gas.

2. In the method of treating raw wellhead gas to recover liquefiable hydrocarbons therefrom and of utilizing the remaining non-condensible hydrocarbon gas as fuel in an internal combustion engine - generator system as claimed in claim 1 wherein a portion of the coolant removed from the cooling section of the engine of said engine - generator system is further heated by indirect heat exchange with the higher temperature combustion exhaust gases leaving the combustion section of said engine before said water coolant is utilized as a waste heat source for heating the circulating fluid medium in said organic Rankine cycle engine.

3. In the method of treating raw wellhead gas to recover liquefiable hydrocarbons therefrom and of utilizing the remaining non-condensible hydrocarbon gas as fuel in an internal combustion engine - generator system as claimed in claim 1 wherein the compressed raw wellhead gas is subjected to dehydration, prior to the cooling of said gas, to remove any entrained water from said raw gas.

4. In the method of treating raw wellhead gas to recover liquefiable hydrocarbons therefrom and of utilizing the remaining non-condensible hydrocarbon gas as fuel in an internal combustion engine - generator system as claimed in claim 1 wherein the second portion of work energy produced by said Rankine cycle engine is utilized to compress the refrigerant of a closed refrigeration circuit with said compressed refrigerant thereafter expanded with attendant cooling in said circuit to indirectly cool the compressed wellhead gas to condense the ethane and higher molecular weight hydrocarbon components of said wellhead gas.

5. In the method of treating raw wellhead gas to recover liquefiable hydrocarbons therefrom and of utilizing the remaining non-condensible hydrocarbon gas as fuel in an internal combustion engine - generator system as claimed in claim 1 wherein the circulating fluid medium in the closed circuit organic Rankine cycle engine is a liquefiable gaseous hydrocarbon refrigerant which is cooled and condensed to liquid form with the liquid hydrocarbon refrigerant thereafter heated indirectly by the heated water coolant from the engine of said internal combustion engine - generator system to expand said hydrocarbon refrigerant with the attendant production of work energy by said Rankine cycle engine.

6. In the method of treating raw wellhead gas to recover liquefiable hydrocarbons therefrom and of utilizing the remaining non-condensible hydrocarbon gas as fuel in an internal combustion engine - generator system as claimed in claim 1 wherein the raw wellhead gas is compressed to a pressure of 270-320 psi and cooled to a temperature of $-20°$ F. to 20° F. to condense the ethane and higher molecular weight hydrocarbon components of said wellhead gas.

7. A system for treating raw wellhead gas to recover liquefiable hydrocarbons therefrom and for utilizing the remaining non-condensible hydrocarbon gas as fuel in an internal combustion engine driving an electric generator to produce electric power comprising:

(a) means for compressing raw wellhead gas to a pressure of 270-320 psi and means for cooling said compressed wellhead gas to a temperature of $-20°$ F. to 20° F. to condense the ethane and higher molecular weight hydrocarbon components of said wellhead gas;

(b) pressure chamber means for separating the condensed components of said wellhead gas from the non-condensible methane and lower molecular weight components thereof;

(c) means for removing from the pressure chamber means the condensed components of said wellhead gas as a bottoms stream of liquefied hydrocarbon product and means for receiving and storing said liquefied hydrocarbon product;

(d) a water-cooled, gas-fired internal combustion engine for driving an electric generator for producing electric power;

(e) means for removing from the pressure chamber means the non-condensible methane and lower molecular weight components of said wellhead gas as an overhead gaseous fuel and means for reducing the pressure of said gaseous fuel and feeding said fuel to said internal combustion engine for combustion therein to drive said engine;

(f) means for introducing water coolant to the cooling section of the water-cooled internal combustion engine to cool said engine with the attendant heating of said coolant;

(g) a closed circuit organic fluid Rankine cycle engine including a pump for circulating said fluid in the closed circuit of said engine, a boiler for heating the organic fluid circulating in said closed circuit, an expander for expansion of said heated fluid with the attendant production of work energy, and a condenser for the cooling and condensing of said expanded fluid;

(h) means for removing heated water coolant from the cooling section of said internal combustion engine, passing said heated coolant in a closed coolant circuit to and through the boiler of said Rankine cycle engine for indirect heat exchange with and the heating of the organic fluid circulating through said boiler to provide heat energy to drive said Rankine cycle engine and thereafter recirculating said water coolant at reduced temperature via said closed coolant circuit to the cooling section of said internal combustion engine; and (i) means for utilizing the work energy produced by the organic Rankine cycle engine in part to provide the work energy required to drive the means for compressing the raw wellhead gas and in part to provide the work energy required to operate the means for cooling said compressed wellhead gas.

8. A system for treating raw wellhead gas to recover liquefiable hydrocarbons therefrom and for utilizing the remaining non-condensible hydrocarbon gas as fuel in an internal combustion engine as claimed in claim 7 wherein the means for removing heated water coolant from the cooling section of said engine, passing said heated coolant to the boiler of the organic fluid Rankine cycle engine and recirculating said water coolant to said cooling section is a hot water circulation pump and there is incorporated in the closed coolant circuit of said internal combustion engine, before the fluid boiler of said Rankine cycle engine, a heat exchanger for receiving waste heat from the combustion exhaust gases of said internal combustion engine and for transferring said heat to a portion of the heated water coolant to further heat said coolant prior to its passage through the boiler of said Rankine cycle engine.

9. A system for treating raw wellhead gas to recover liquefiable hydrocarbons therefrom and for utilizing the remaining non-condensible hydrocarbon gas as fuel in an internal combustion engine as claimed in claim 7 wherein the boiler and condenser in the closed circuit of the organic Rankine cycle engine are shell and tube heat exchangers and the expander is a positive displacement, rotary screw fluid expansion device.

10. A system for treating raw wellhead gas to recover liquefiable hydrocarbons therefrom and for utilizing the remaining non-condensible hydrocarbon gas as fuel in an internal combustion engine as claimed in claim 7 wherein gas dehydration means is provided to remove any entrained water from the raw wellhead gas after its compression and before its cooling.

11. A system for treating raw wellhead gas to recover liquefiable hydrocarbons therefrom and for utilizing the remaining non-condensible hydrocarbon gas as fuel in an internal combustion engine as claimed in claim 7 wherein the pressure chamber means for separating the condensed components of said wellhead gas from the non-condensible methane and lower molecular weight components thereof is a cyclone chamber.

12. In the method of treating raw wellhead gas to recover liquefiable hydrocarbons therefrom and of utilizing the remaining non-condensible hydrocarbon gas as fuel in an internal combustion engine - generator system to produce electric power, the steps comprising:

(a) compressing raw wellhead gas to a pressure and cooling said compressed wellhead gas to a temperature sufficient to condense the ethane and higher molecular weight hydrocarbon components of said wellhead gas;

(b) subjecting the raw wellhead gas to dehydration treatment after its compression and before its cooling to remove any entrained water from said raw gas;

(c) separating the condensed components of said wellhead gas from the non-condensible methane and lower molecular weight components thereof in a pressure chamber and removing said condensed components of said wellhead gas from said chamber as a bottoms stream of liquefied hydrocarbon product;

(d) removing the non-condensible methane and lower molecular weight components of said wellhead gas from said pressure chamber as a combustible gaseous stream and utilizing said gaseous stream as fuel in the engine of an internal combustion engine - generator system to produce electric power;

(e) introducing water coolant to the cooling section of the engine of said engine - generator system to cool said engine with the attendant heating of said coolant;

(f) removing the heated water coolant from the cooling section of said engine and utilizing said heated coolant as a waste heat source for heating the circulating fluid medium in a closed circuit organic Rankine cycle engine to produce work energy;

(g) utilizing a first portion of the work energy produced by said Rankine cycle engine to compress said wellhead gas and a second portion of the work energy produced by said Rankine cycle engine to cool said compressed wellhead gas to condense the ethane and higher molecular weight hydrocarbon components of said wellhead gas; and (h) passing a portion of the heated water coolant removed from the cooling section of the engine of said engine - generator system in indirect heat exchange relationship with the hot combustion exhaust gases leaving said engine to further heat said coolant portion and utilizing said further heated coolant portion as a heat source to effect the dehydration treatment of the compressed raw wellhead gas before utilizing said coolant portion as a portion of the waste heat source for heating the circulating fluid medium in said organic Rankine cycle engine.

13. In the method of treating raw wellhead gas to recover liquefiable hydrocarbons therefrom and of utilizing the remaining non-condensible hydrocarbon gas as fuel in an internal combustion engine - generator system as claimed in claim 12 wherein the second portion of work energy produced by said Rankine cycle engine is utilized to compress the refrigerant of a closed refrigeration circuit with said compressed refrigerant thereafter expanded with attendant cooling in said circuit to indirectly cool the compressed wellhead gas to condense the ethane and higher molecular weight hydrocarbon components of said wellhead gas.

14. In the method of treating raw wellhead gas to recover liquefiable hydrocarbons therefrom and of utilizing the remaining non-condensible hydrocarbon gas as fuel in an internal combustion engine - generator system as claimed in claim 12 wherein the circulating fluid medium in the closed circuit organic Rankine cycle engine is a liquefiable gaseous hydrocarbon refrigerant which is cooled and condensed to liquid form with the liquid hydrocarbon refrigerant thereafter heated indirectly by the heated water coolant from the engine of said internal combustion engine - generator system to expand said hydrocarbon refrigerant with the attendant production of work energy by said Rankine cycle engine.

* * * * *